United States Patent Office 2,772,757
Patented Dec. 4, 1956

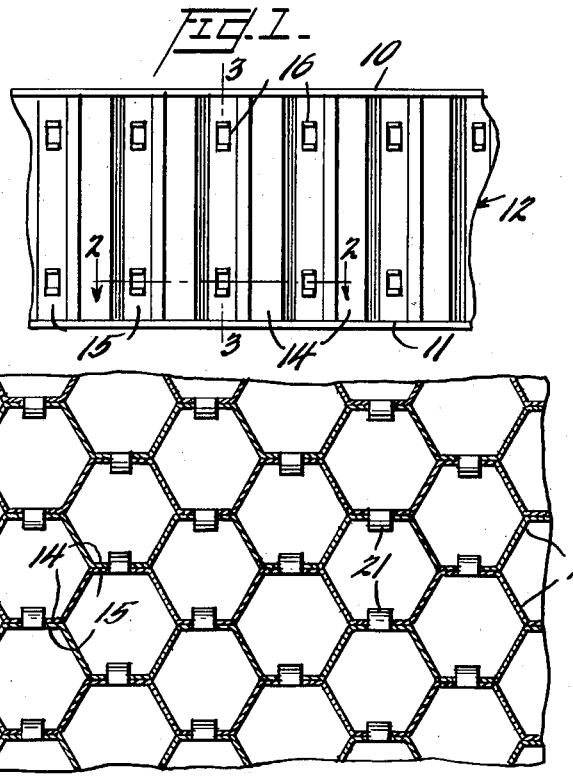
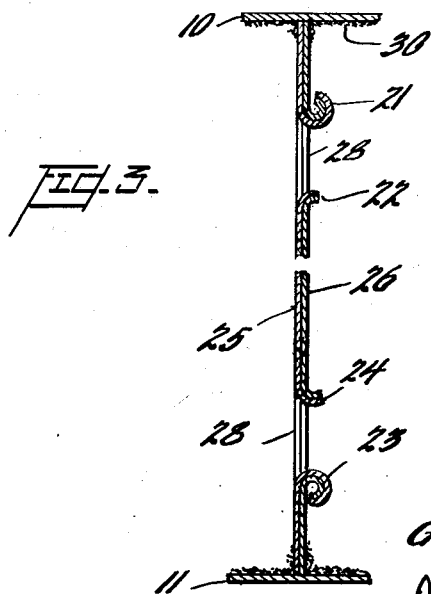
INVENTOR
Gordon Hammond,
BY Donald L. Rose
ATTORNEY

2,772,757

STRUCTURAL MATERIAL

Gordon Hammond, Ashland, Va.

Application November 19, 1952, Serial No. 321,349

3 Claims. (Cl. 189—34)

This invention relates to cellular structures and more particularly to a cellular core structure of novel construction.

Most broadly this invention comprises a multi-layered panel consisting of relatively thin sheets separated by a cellular core structure of comparatively slight unit density. These laminar panels may be constructed from two sheets separated by a single core element or may include several sheets separated by alternate layers of core elements.

In forming panels of this type it is necessary to separately form the cellular core structure and then laminate the covering sheets to the core element. Numerous methods have been devised for forming these multi-cellular core elements, the general practice consisting in utilizing very thin strips of a suitable material subsequently formed and rigidly attached together in such manner that the composite core structure cannot be bent without a saddle action.

The core structure of my invention is formed in a suitable manner from a plurality of strips with alternate raised and depressed areas extending transversely of each strip and each strip is so positioned that the raised areas of one strip are contacting the depressed areas of the adjacent strip. These strips are maintained in this assembled position and a portion of the contacting area of a strip is caused to be partially severed from the strip and bent over into interlocking relationship with its adjacent strip. As these clasps are formed preferably at each of the contacting areas of the adjacent strips the entire core structure is held together as a relatively rigid structure by these locks. The core structure may be lifted and transported without danger of the locks failing and the entire core rendered useless prior to assembly.

The locks may be formed in a rapid operation without necessitating the time required to set an adhesive. The strength of these locked joints compares favorably with adhesive bonds to form a somewhat more flexible core element that will readily withstand normal handling strains without becoming partially disassembled. This increased flexibility of the core reduces the saddle action and enables the core to more readily conform to curved covering sheets.

One object of my invention is to provide an inexpensive reticulated core material for a laminar panel which is constructed from a plurality of strips attached together by locks formed from the strip material.

Another object of my invention is to provide a reticulated core material formed of metal foil strips locked together at spaced intervals.

It is a further object of my invention to provide a cellular core material which contains no adhesive yet which is locked together to give a relatively high strength against lateral tensile forces.

Other objects and advantages of the present invention will be apparent from the following description and the accompanying drawings in which:

Figure 1 is a side view of a panel formed from the core material of my invention;

Figure 2 is a sectional view of the core material of my invention on line 2—2 of Figure 1, and;

Figure 3 is a sectional view of the core material of my invention at the areas at which adjacent strips are interconnected taken on line 3—3 of Figure 1.

Referring to Figure 1, I have illustrated a side view of the preferred embodiment of my invention in which the laminar panel is formed as a sandwich of two relatively thin surface sheets 10 and 11 and a cellular core material 12.

The core material is made from a number of strips of thin material, each of which is formed with alternately raised areas 14 and depressed areas 15 extending transversely of the strip. The strips are positioned adjacently so that raised areas of one strip are contacting or abutting the depressed areas of an adjacent strip. The adjacent strips are locked together at these contacting areas by locking means or clasps 16 formed from material from one strip bent over its adjacent strip in an interlocking engagement.

The core structure as illustrated and clearly visible in the preferred embodiment in Figure 2 is made from a series of strips 18 formed with alternate transverse surface areas displaced from a median plane and joined by sloping material to form half hexagons. With the surface areas of adjacent strips contacting the half hexagons of adjacent strips come together to form parallel and staggered hexagonal cells.

It is readily visible in Figure 2 and Figure 3 that the locking means as illustrated consists of two clasps, 21 and 22. These clasps are formed from material of one strip 25 in the form of a tongue folded over in a vertical plane to interlock with material of its adjacent strip 26 also in the form of a tongue. In forming these joints apertures 28 are produced in the material.

In the illustrations four clasps are provided at each of the contacting areas. The outer clasps 21 and 23 are each formed from a pair of tongues of metal folded over to form a joint with considerable strength against stresses applied to the core transversely to the general direction of the strips. The inner clasps 22 and 24 are particularly useful in resisting stresses tending to slide adjacent strips apart transversely of the strips. It is more readily seen in Figure 2 that stresses tending to separate the strips in a direction longitudinally of the strips are resisted by the bent over portions of the strips bearing against the transverse side walls of the apertures 28.

Suitable joint strength may be obtained by utilizing only two clasps such as 21 and 23 at each contacting or abutting area of adjacent strips, particularly when a relatively thin core element such as ½ of an inch thick is produced. The clasp 22 may be formed as illustrated or further bent over for added strength, however, it is desirable that at least two such oppositely extending clasps as 21 and 23 are used to give strength against the strips sliding apart in a direction transverse of the strips. In cores which are thicker, in the order of one or two inches, four clasps are used for the added strength. The clasps are preferably formed in the body of the strip with two clasps formed for each aperture.

These clasps of my preferred embodiment are formed from material rolled over into interlocking position which will generally produce a stronger lock than a flattened out clasp. Additionally, since the greatest stresses are those extending generally transversely of the core, the clasps formed by partially severing the metal and folding it back transversely of the strip resist the tendency to unroll or unfold and break the joint better than clasps which are formed by rolling or folding over the partially severed metal in a direction longitudinal of the strips. I also prefer clasps formed by interlocking material from adjacent strips rather than a clasp formed by rolling or folding over metal of one strip through a preformed aperture in its adjacent strip and against the opposite wall of the adjacent strip. This interlocking of partially severed metal of adjacent strips possesses very satisfactory strength against stresses in several directions.

I prefer to use relatively thin aluminum foil strips for the core structure. Aluminum possesses many characteristics required to make satisfactory core elements and additionally may be readily formed into the clasps without fracturing and set in this formed position without appreciable spring back of the metal. Suitable cores may be made from foil approximately from .0015 inch thick to .006 inch thick and from ½ of an inch to 2 inches wide depending on the mechanical properties required by the panel.

Other materials may be used for the core which are satisfactory for making core elements, such as impregnated paper and fabrics and other metals, and which possess the ability to form the lock joints of my invention without fracturing and without enough spring back to destroy the locks.

These cores are attached to the covering sheets 10 and 11 by an adhesive 30. Any suitable material may be used for these covering sheets such as relatively thin aluminum sheet, wood panels, plaster board and others. The material, thickness and other details of the covering sheets are selected as a matter of choice depending on the overall strength required by the panel and depending on its end use.

The panels are formed of any desired length and width by using properly dimensional core material and covering sheets although formed panels may be sawed or otherwise reduced in size.

While the form of the invention illustrated herein is preferred, the invention is not necessarily limited to the illustrated embodiment, and further, variations and modifications, such as would occur to one skilled in the art, are considered part of the invention.

I claim:

1. A cellular core for use in a structural panel, comprising a plurality of superimposed elongated metal foil strips having transversely extending alternately raised and depressed portions, the raised portions of each of said strips abutting the depressed portions of an adjacent strip and forming transverse cells therewith between said raised and depressed portions, and at least two clasps each formed from a pair of metal foil tongues extending from at least some of the abutting raised and depressed portions of said strips, and securing said strips together, the pair of tongues in each said clasp being integral respectively with one of said strips and said strip adjacent thereto, and extending from the walls of aligned apertures through two of said abutting portions thereof, one foil tongue in each clasp extending from its corresponding foil strip through the aperture in the adjacent foil strip and thence being superimposed over the other of said tongues of each said clasp, the foil tongues in each of said clasps including portions having interengaging bends resisting separation of said tongues and separation of their corresponding foil strips, at least one of said clasps extending in a direction opposite to that of another of said clasps to resist separation of the corresponding raised and depressed portions.

2. A cellular core for use in a structural panel comprising a plurality of superimposed elongated metal foil strips of a thickness from about .0015 inches to .006 inches, said foil strips having transversely extending alternately raised and depressed portions, the raised portions of each of said foil strips substantially abutting the depressed portions of an adjacent one of said strips forming transverse cells alternately between said abutting portions of adjacent strips and at least two clasps each formed from a pair of metal foil tongues struck from at least some of said abutting raised and depressed portions and further disposed in rows extending longitudinally of said abutting strips, holding said strips together, one foil tongue in each of said clasps being bent from its corresponding foil strip in superimposed relation with the other of said tongues outward through an aperture in the adjacent foil strip left by said other tongue and said tongues together being curved outward beyond said opening over said adjacent strip in spaced relation to the latter and thence inward toward said adjacent strip, said tongues mutually contacting each other and curved throughout their entire length, at least one of said clasps curved back from said abutting portion in a direction opposite to the curvature of another of said clasps to resist separation of the corresponding raised and depressed portions.

3. A cellular core for use in a structural panel comprising a plurality of superimposed elongated metal foil strips of a thickness from about .0015 inches to .006 inches, said foil strips having transversely extending alternately raised and depressed portions, the raised portions of each of said foil strips substantially abutting the depressed portions of an adjacent one of said strips forming transverse cells alternately between said abutting portions of adjacent strips, and at least two clasps each formed from a pair of metal foil tongues struck from at least some of said abutting raised and depressed portions leaving apertures substantially inside the opposite edges of said abutting strips and further disposed in rows extending longitudinally of said strips marginally inside the edges of each of said strips and the strip abutting the same, holding said strips together, one foil tongue in each of said clasps extending from its corresponding foil strip through an aperture in the adjacent foil strip left by the other of said tongues and said tongues thence having superimposed substantially unrestrained curls arcuate and interengaging each other throughout their extent, and said tongues being curled on axes substantially parallel to the length of said strips, at least one of said clasps curled back from said abutting portion in a direction opposite to the curvature of another of said clasps to resist separation of the corresponding raised and depressed portions.

References Cited in the file of this patent

UNITED STATES PATENTS

| Number | Name | Date |
| --- | --- | --- |
| 182,193 | Holeton | Sept. 12, 1876 |
| 917,355 | Phillips | Apr. 6, 1909 |
| 941,013 | Doble et al. | Nov. 23, 1909 |
| 1,141,046 | Dubus | May 25, 1915 |
| 1,700,561 | Commin et al. | Jan. 29, 1929 |
| 2,056,563 | Budd et al. | Oct. 6, 1936 |
| 2,215,918 | Fay | Sept. 24, 1940 |
| 2,445,815 | Youmans | July 27, 1948 |
| 2,457,343 | Braunschweiger | Dec. 28, 1948 |
| 2,512,875 | Reynolds | June 27, 1950 |
| 2,609,068 | Pajak | Sept. 2, 1952 |
| 2,644,552 | MacDonald | Nov. 19, 1952 |

FOREIGN PATENTS

| 451,182 | Great Britain | July 31, 1936 |